Patented June 26, 1945

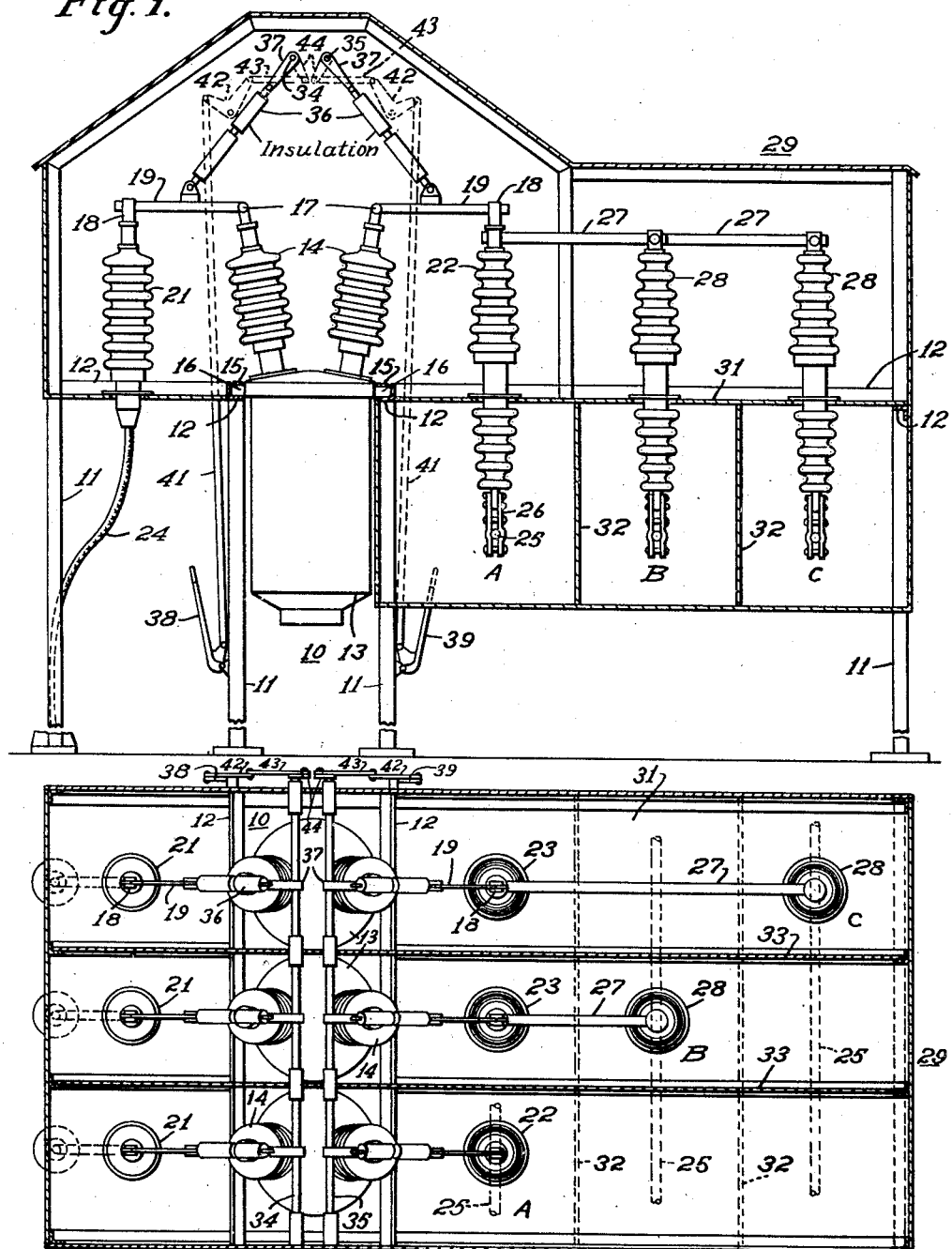
June 26, 1945. H. H. RUGG 2,379,188
METAL ENCLOSED SWITCHGEAR
Filed Aug. 22, 1941 2 Sheets-Sheet 1

2,379,188

UNITED STATES PATENT OFFICE 2,379,188

METAL ENCLOSED SWITCHGEAR

Harold H. Rugg, Wilkinsburg, Pa., assignor to Westinghouse Electric Corporation, East Pittsburgh, Pa., a corporation of Pennsylvania Application August 22, 1941, Serial No. 407,888

2 Claims. (Cl. 175—298)

My invention relates, generally, to switchgear apparatus for distributing electric power and, more particularly, to metal enclosed switchgear.

Prior to this time several types of switchgear apparatus have been developed and utilized in this country and abroad with a view toward reducing the danger of interphase short circuits and the hazard to life in power distribution systems. Among the first was the Reyrolle system, developed in Europe, and in which the buses are disposed in rigid cast metal housings or compartments containing insulating compound.

Following the Reyrolle system, the Jamieson or segregated phase system was developed in this country. As indicated above, in the Jamieson system the apparatus and conductors of each phase are segregated in space.

In a more recent system, developed in this country by Mr. Allen M. Rossman, the phase conductors are disposed in individual sheathing or tubing filled with insulating oil. The sheathing or tubing is relatively light in weight and is supported on structural framework.

Each one of the foregoing systems has certain disadvantages. Thus, in the Reyrolle system, the structure is both heavy and expensive and requires a relatively large amount of space. The Jamieson system requires a still greater amount of space and the live parts are exposed, which is undesirable, particularly in an outdoor installation. While the Rossman system is lighter in weight than the Reyrolle system and requires less space than either the Reyrolle or the Jamieson systems, it is still relatively expensive to manufacture and install. Furthermore, the use of insulating oil in the sheathing creates a fire hazard.

Accordingly, an object of my invention, generally stated, is to provide switchgear apparatus which is safe and efficient in operation and which may be economically manufactured and installed.

A more specific object of my invention is to provide switchgear apparatus suitable for high voltage service.

Another object of my invention is to reduce the space required for the installation of high voltage switchgear.

A further object of my invention is to isolate each phase of multi-phase switchgear apparatus.

Still another object of my invention is to provide switchgear apparatus to which a ground protection scheme may be readily applied.

A still further object of my invention is to provide metal enclosed switchgear which may be completely manufactured at the factory in individual units and any desired number of units readily installed in the field.

Other objects of my invention will be explained fully hereinafter or will be apparent to those skilled in the art.

In accordance with my invention, all live parts are enclosed in a weatherproof metal housing with the phases segregated by metal barriers. Each circuit breaker unit is elevated on a metal framework which also supports the sheet metal housing and barriers. Gang-operated disconnecting switches are mounted with either the hinge jaw or the break jaw directly on the circuit breaker bushings. The opposite ends of the switches are mounted directly on pothead insulators in the case of line disconnects, and for bus disconnects they are mounted either on a bushing supporting one bus bar at its opposite end or on a support connected to similar bushings for the other bus bars, thereby eliminating a number of insulators usually required. The units may be arranged in rows with the bus extending continuously through any number of units.

For a fuller understanding of the nature and objects of my invention, reference may be had to the following detailed description, taken in conjunction with the accompanying drawings, in which:

Figure 1 is a view, partly in elevation and partly in section, of a switchgear unit embodying my invention;

Fig. 2 is a view, partly in plan and partly in section, of the switchgear unit shown in Fig. 1;

Figure 3:
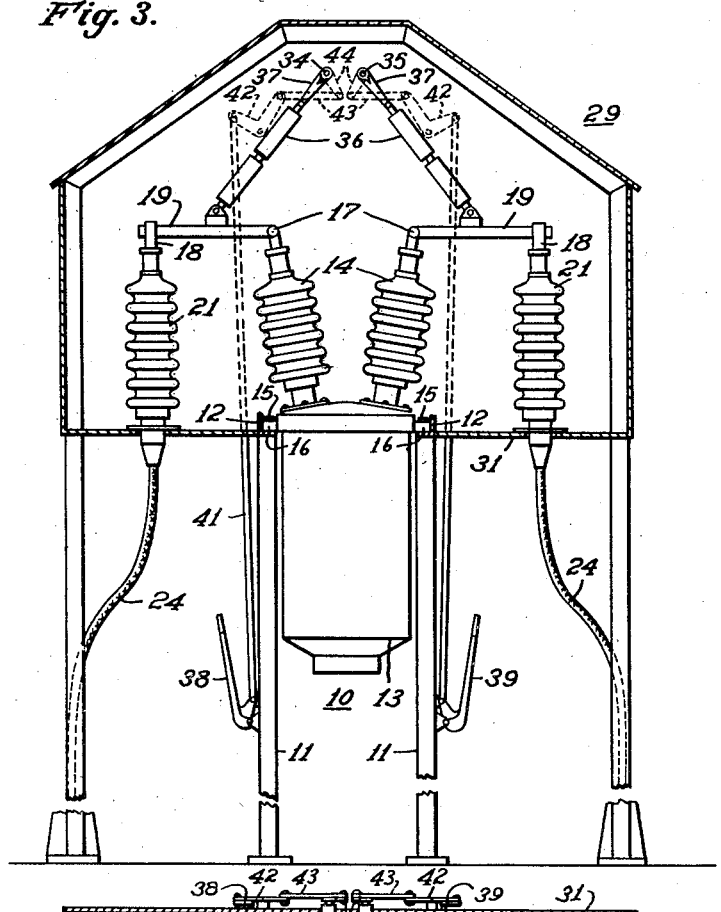
Fig. 3 is a view, partly in elevation and partly in section of a modification of my invention.

Referring now to the drawings, and particularly to Figs. 1 and 2, there is illustrated therein a switchgear unit for connecting a three-phase line with a three-phase bus. The switchgear unit comprises a structural framework for supporting a circuit breaker 10 in an elevated position. The framework includes upright members 11 and horizontal members 12, which may be secured together by welding or in any other suitable manner.

The circuit breaker unit comprises three tanks 13, each one of which contains the contact members for one phase of the three-phase unit, and terminal bushings 14, a pair of which is disposed on top of each tank 13 for making electrical connections to the contact members inside the tanks. The tanks 13 may be secured to horizontal cross members 12 by means of bolts 15 which extend through lugs 16 provided on the sides of the tanks.

In power systems it is the usual practice to provide disconnect switches for disconnecting certain of the circuit breakers from the power conductors. The disconnect switches are usually so interlocked with the circuit breaker that the switches cannot be opened while carrying current. However, the switches must be so designed and mounted that they are capable of carrying the maximum load current and withstanding the voltage of the power system.

Heretofore, the disconnecting switches have been mounted on separate insulating members which are supported independently of the breaker unit. In order to reduce the number of insulating members and to decrease the amount of space required for the disconnecting switches in the present structure, either the hinge jaw 17 or the break jaw 18 of each switch blade 19 may be mounted directly on one of the circuit breaker bushings 14, with the opposite end of the switch mounted directly on an insulated terminal 21, 22 or 23.

As shown in Figs. 1 and 2, the ends of the terminals 21 opposite the disconnect terminals are connected to line conductors or cables 24. The ends of the terminal 22 opposite the disconnect terminal for phase A is connected to a bus conductor 25 which is secured to the terminal 22 by a clamp 26. The terminals 23, which support the disconnect terminals for phases B and C are connected by straps 27 to the upper ends of terminals 28, the lower ends of which support the bus conductors for phases B and C in the same manner as the terminal 22. In this manner a number of insulators are eliminated which would be required if the disconnect switches were supported in the conventional way.

Furthermore, the space requirements are reduced and all live parts of the apparatus may be readily enclosed by providing a weatherproof housing 29 which is supported by the upright members 11 and horizontal members 12. The insulating terminals 21, 22, 23 and 28 are supported by a bottom plate 31 of the housing 29. Thus, the upper ends of the terminals for the line and bus conductors are disposed at substantially the same elevation as the upper ends of the circuit breaker bushings 14. The lower portions of the terminals 22 and 28, which support the bus conductors 25 are enclosed by a portion of the housing 29 disposed underneath a part of the plate 31. Thus, the plate 31 separates the bus compartment from the terminal compartment.

In order to isolate the apparatus for each phase from the other phases, metal barriers or partitions 32 are provided between the bus conductors 25 in the lower portion of the housing 29. Similar barriers 33 are provided in the upper portion of the housing above the plate 31 to isolate the disconnect switches, terminal bushings and insulating terminals for each phase from those for the other phases. In this manner each phase is completely segregated from the other phases.

The line disconnecting switches and the bus disconnecting switches may be gang operated by shafts 34 and 35, respectively, rotatably mounted in the housing 29 above the switches. Each switch blade 19 is connected to its operating shaft by insulating members 36 and an arm 37 secured to the shaft. An operating handle 38 is provided for the shaft 34 and a similar handle 39 is provided for the shaft 35. The handles 38 and 39 may be mounted exteriorly of the housing 29 within reach of an operator. Each handle may be connected to its respective shaft by means of a vertically disposed rod 41, a bell crank 42, a horizontally disposed rod 43 and a lever arm 44 in such a manner that the switches may be closed and opened by raising and lowering the proper handle. It will be understood that the disconnecting switches may be so interlocked with the circuit breaker mechanism in the usual manner that the switches cannot be operated while the breaker contacts are closed.

It will also be understood that overhead lines, instead of underground lines, may be brought into the unit by substituting roof bushings for the terminal bushing 21 and mounting one end of the line disconnecting switches on the lower ends of the roof bushings.

Figure 4:
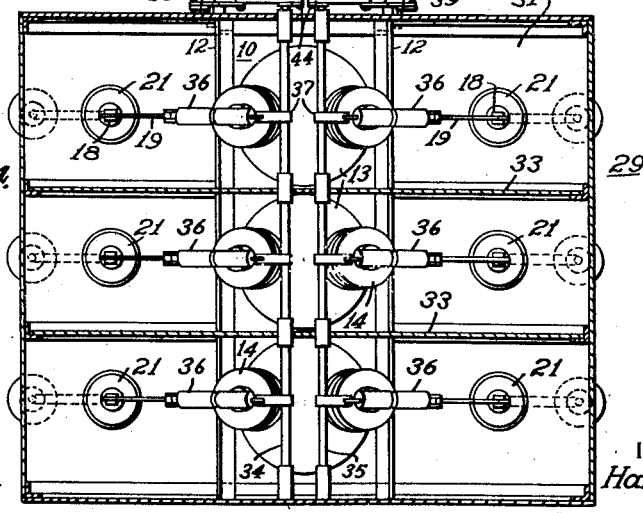
Fig. 4 is a view, partly in plan and partly in section, of the structure shown in Fig. 3.

The structure shown in Figs. 3 and 4, in which like parts are designated by the same reference characters as in Figs. 1 and 2, is similar to the structure described hereinbefore with the exception that the bus conductors are omitted. Therefore, the unit shown in Figs. 3 and 4 is suitable for controlling a high voltage line or transformer bank. The underground lines 24 may be brought into the housing through insulating bushings 21, which support one end of the disconnect switches in the manner hereinbefore described. If overhead lines are desired, roof bushings may be substituted for the cable bushings, as explained hereinbefore. The disconnect switches may be operated in the same manner as previously described.

A ground protection scheme of a type well known in the art may be readily applied to the present structures by grounding the housing 29 through ground protective relays. Thus, complete protection may be provided against grounds in the insulating terminals and bushings as well as in the circuit breaker unit.

The structures herein described may be manufactured in single units, as shown, and as many units as desired assembled together. The capacity of a switching station may be increased at any time by simply adding additional units. The structures may be readily designed for a wide range of voltages and currents.

From the foregoing description it is apparent that I have devised switchgear apparatus having numerous advantages over conventional outdoor structures. Some of these advantages are: decreased ground area and height; increased safety to life and continuity of operation, and decreased cost of manufacture and installation.

It is evident that the present structure may be manufactured at less cost than previously known structures which are more complicated in design and heavier in weight. Furthermore, the fire hazard created by the use of oil filled sheathings is eliminated.

Since many modifications may be made in the apparatus and arrangement of parts without departing from the spirit of my invention, I do not wish to be limited other than by the scope of the appended claims.

I claim as my invention:

1. In electric switchgear of the multi-phase type, in combination, a structural framework, a multi-phase circuit breaker unit and a unitary metal housing supported by said framework, said breaker unit having terminal bushings thereon for each phase, disconnecting switches for each phase having one terminal mounted on said bushings, insulated terminals disposed at opposite sides of the breaker unit for supporting the other terminals of the disconnecting switches on the upper ends thereof, power conductors supported by the lower ends of said terminals, a metal plate for dividing a portion of said housing into a terminal compartment and a bus compartment, the insulated terminals at one side of the breaker unit being supported by said plate, additional insulated terminals supported by said plate and having one end disposed in the terminal compartment and the other in the bus compartment, power conductors horizontally disposed in the bus compartment in a horizontal plane and supported by said terminals, said bus compartment being on substantially the same level as the circuit breaker unit, and metal barriers disposed in said housing transversely of and parallel to said power conductors to isolate each phase from the other phases.

2. In electric switchgear of the multi-phase type, in combination, a structural framework, a multi-phase circuit breaker unit and a unitary metal housing supported by said framework, said breaker unit having terminal bushings thereon for each phase, disconnecting switches for each phase having one terminal mounted on said bushings, insulated terminals disposed at opposite sides of the breaker unit for supporting the other terminals of the disconnecting switches on the upper ends thereof, power conductors supported by the lower ends of said terminals, a metal plate for dividing a portion of said housing into a terminal compartment and a bus compartment, the insulated terminals at one side of the breaker unit being supported by said plate, additional insulated terminals supported by said plate and having one end disposed in the terminal compartment and the other in the bus compartment, power conductors horizontally disposed in the bus compartment in a horizontal plane and supported by said terminals, said bus compartment being on substantially the same level as the circuit breaker unit, the disconnecting switches, terminal bushings and insulated terminals for each phase being isolated from the other phases by metal partitions disposed in the terminal compartment transversely of the power conductors, and additional metal partitions disposed in the bus compartment parallel to the power conductors.

HAROLD H. RUGG.